US011620956B2

(12) United States Patent
Li et al.

(10) Patent No.: US 11,620,956 B2
(45) Date of Patent: Apr. 4, 2023

(54) MULTI-REGION BACKLIGHT CONTROL SYSTEM AND METHOD, TELEVISION, AND READABLE STORAGE MEDIUM

(71) Applicant: SHENZHEN SKYWORTH-RGB ELECTRONIC CO., LTD., Shenzhen (CN)

(72) Inventors: Xin Li, Shenzhen (CN); Wensheng Hong, Shenzhen (CN); Tiejun Lu, Shenzhen (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 275 days.

(21) Appl. No.: 17/008,958

(22) Filed: Sep. 1, 2020

(65) Prior Publication Data

US 2020/0394970 A1     Dec. 17, 2020

Related U.S. Application Data

(63) Continuation of application No. PCT/CN2018/120341, filed on Dec. 11, 2018.

(30) Foreign Application Priority Data

Jul. 12, 2018  (CN) .......................... 201810766756.5

(51) Int. Cl.
*G09G 3/34* (2006.01)
*G09G 3/36* (2006.01)
*H04N 5/58* (2006.01)

(52) U.S. Cl.
CPC .......... *G09G 3/342* (2013.01); *G09G 3/3413* (2013.01); *G09G 3/36* (2013.01); *H04N 5/58* (2013.01);
(Continued)

(58) Field of Classification Search
CPC ........ G09G 3/342; G09G 3/3413; G09G 3/36; G09G 2320/0238; G09G 2320/0626;
(Continued)

(56) References Cited

U.S. PATENT DOCUMENTS 5,337,068 A * 8/1994 Stewart .................... H04N 9/30
345/88
2009/0179841 A1    7/2009 Visser
(Continued)

FOREIGN PATENT DOCUMENTS

CN          1987565 A  *  6/2007
CN          1987565 A     6/2007
(Continued)

OTHER PUBLICATIONS

Cai, Fu Zhanwei, Machine Translation of Foreign Patent Document CN 1987565A, Liquid crystal display and its back light brightness regulating method, Jun. 27, 2007, pp. 1-9 (Year: 2007).*
(Continued)

*Primary Examiner* — Amr A Awad
*Assistant Examiner* — Maheen I Javed
(74) *Attorney, Agent, or Firm* — Westbridge IP LLC (57) ABSTRACT

Disclosed are a multi-region backlight control system, a multi-region backlight control method, a television and a readable storage medium. The multi-region backlight control system includes a color liquid crystal display screen, a non-color liquid crystal display screen, a first driver, a second driver, a constant backlight source, and a main controller; the color liquid crystal display screen and the non-color liquid crystal display screen are sequentially fixed on the constant backlight source, and the non-color liquid crystal display screen is disposed between the color liquid crystal display screen and the constant backlight source; the main controller is respectively connected with the first
(Continued)

driver, the second driver and the constant backlight source, the first driver is electrically connected with the color liquid crystal display screen, and the second driver is electrically connected with the non-color liquid crystal display screen.

20 Claims, 4 Drawing Sheets

(52) U.S. Cl.
CPC ............... *G09G 2320/0238* (2013.01); *G09G 2320/0626* (2013.01); *G09G 2320/0686* (2013.01); *G09G 2360/144* (2013.01)

(58) Field of Classification Search
CPC ..... G09G 2320/0686; G09G 2360/144; G09G 2300/023; G09G 2320/0646; G09G 3/3426; H04N 5/58; H04N 5/06; H04N 5/04
See application file for complete search history.

(56) References Cited

U.S. PATENT DOCUMENTS

| | | | |
|---|---|---|---|
| 2010/0053051 A1* | 3/2010 | Nitanda | G09G 3/2003 349/116 |
| 2013/0082607 A1 | 4/2013 | Gandhi et al. | |
| 2014/0049571 A1 | 2/2014 | Erinjippurath et al. | |
| 2017/0148394 A1* | 5/2017 | Gao | G09G 3/36 |

FOREIGN PATENT DOCUMENTS

| | | |
|---|---|---|
| CN | 201037882 Y | 3/2008 |
| CN | 105093390 A | 11/2015 |
| CN | 105390067 A | 3/2016 |
| CN | 105551444 A | 5/2016 |
| CN | 105654910 A | 6/2016 |
| CN | 106959543 A | 7/2017 |
| CN | 207181888 U | 4/2018 |
| CN | 108833814 A | 11/2018 |
| JP | 2011237528 A | 11/2011 |
| WO | 2015178698 A1 | 11/2015 |

OTHER PUBLICATIONS

Office Action in counterpart Indian Patent Application No. 202027036934, dated Jul. 12, 2021.
Supplementary European Search Report in counterpart European Patent Application No. 18926026.8, dated Oct. 8, 2021.
First Office Action in counterpart Chinese Patent Application No. 201810766756.5, dated Mar. 20, 2020.
International Search Report in corresponding PCT Application No. PCT/CN2018/120341, dated Apr. 2, 2019.

* cited by examiner

MULTI-REGION BACKLIGHT CONTROL SYSTEM AND METHOD, TELEVISION, AND READABLE STORAGE MEDIUM

CROSS REFERENCE TO RELATED APPLICATIONS

The present disclosure is a Continuation Application of International Application No. PCT/CN2018/120341, filed on Dec. 11, 2018, which claims the priority of Chinese Patent Application No. 201810766756.5, entitled "MULTI-REGION BACKLIGHT CONTROL SYSTEM, METHOD, TELEVISION AND READABLE STORAGE MEDIUM", filed on Jul. 12, 2018. The disclosures of the aforementioned applications are hereby incorporated by reference in their entireties.

FIELD

The present application relates to the technical field of television, in particular to a multi-region backlight control system, a multi-region backlight method, a television and a readable storage medium.

BACKGROUND

At present, the liquid crystal display regional backlight brightness control scheme for televisions and other display fields is taking LED (Light Emitting Diode) array as a light source, coordinating with the system to matrix-divide the image signal and calculate the data corresponding to the grayscale values of different matrix addresses through communication protocols such as SPI and control equipment such as multi-region matrix controller, and controlling the matrix controller to output the corresponding PWM signal to control the brightness and darkness of each LED to achieve the control of the brightness and darkness of the backlight in different regions, so as to achieve the purpose of multi-region local dimming to reduce screen light leakage and improve dynamic contrast.

However, with the continuous improvement of liquid crystal display resolution, 4K, 8K and other display technologies continue to mature, the market demand continues to expand, the number of backlight LED lights, the complexity of the design of the multi-region matrix controller, the maximum number of controllable regions, heat dissipation, the main controller scheme and other aspects are limited. The multi-region backlight technology still cannot achieve pixel-level control, and cannot achieve smaller area brightness changes and higher contrast.

SUMMARY

The main object of the present application is to provide a multi-region backlight control system, a multi-region backlight control method, a television and a readable storage medium, aiming to solve the technical problems that the multi-region backlight technology in the prior art cannot achieve smaller regional brightness changes and higher contrast.

In order to achieve the above object, the present application provides a multi-region backlight control system including a color liquid crystal display screen, a non-color liquid crystal display screen, a first driver, a second driver, and a main controller; the color liquid crystal display screen and the non-color liquid crystal display screen are sequentially fixed on the constant backlight source, and the non-color liquid crystal display screen is disposed between the color liquid crystal display screen and the constant backlight source; the main controller is respectively connected with the first driver, the second driver and the constant backlight source, the first driver is electrically connected with the color liquid crystal display screen, and the second driver is electrically connected with the non-color liquid crystal display screen.

In response to receiving an image signal, the main controller is configured to process the image signal to obtain image data, the main controller is configured to send the image data to the first driver and the second driver synchronously and control the constant backlight source to be turned on; the first driver is configured to convert the received image data into a display signal and drive the color liquid crystal display screen to output a display image based on the display signal; the second driver is configured to convert the received image data into a control signal and drive the non-color liquid crystal display screen to adjust light transmittance of each pixel of the non-color liquid crystal display screen based on the control signal.

Preferably, the main controller includes a signal decoder, a display signal unit, a signal encoder, an image collector, a signal processor and a signal outputter; the signal decoder, the display signal unit, the signal encoder and the first driver are connected in sequence; the display signal unit, the image collector, the signal processor, the signal outputter and the second driver are connected in sequence.

Preferably, the multi-region backlight control system further includes a light sensor, where the main controller further includes an interface; the light sensor is connected with the interface, and the interface is connected with the signal processor; the light sensor is configured to detect change of ambient light around a television to obtain detection data, and the light sensor is configured to send the detection data to the signal processor through the interface; the signal processor is configured to process the detection data after receiving the detection data.

The present application further provides a multi-region backlight control method, which is applied to a television. The television includes the multi-region backlight control system described above. The multi-region backlight control method includes the following steps:

in response to receiving an image signal, processing, by the main controller, the image signal to obtain image data, sending, by the main controller, the image data to the first driver and the second driver synchronously, and controlling, by the main controller, the constant backlight source to be turned on;

converting, by the first driver, the received image data into a display signal, and driving, by the first driver, the color liquid crystal display screen to output a display image based on the display signal; and converting, by the second driver, the received image data into a control signal, and driving, by the second driver, the non-color liquid crystal display screen to adjust light transmittance based on the control signal.

Preferably, the main controller includes a signal decoder, a display signal unit and a signal encoder; the signal decoder, the display signal unit, the signal encoder and the first driver are connected in sequence; where the step of in response to receiving an image signal, processing, by the main controller, the image signal to obtain image data, sending, by the main controller, the image data to the first driver and the second driver synchronously includes:

in response to receiving the image signal, decoding, by the signal decoder, the image signal to obtain image information;

processing, by the display signal unit, the received image information to obtain the image data;

sending, by the display signal unit, the image data to the signal encoder and the second driver; and encoding, by the signal encoder, the received image data according to an output signal standard to obtain an encoding result, and outputting, by the signal encoder, the encoding result to the first driver.

Preferably, the main controller further includes an image collector, a signal processor and a signal outputter; the display signal unit, the image collector, the signal processor, the signal outputter and the second driver are connected in sequence; where the step of converting, by the second driver, the received image data into a control signal, and driving, by the second driver, the non-color liquid crystal display screen to adjust light transmittance based on the control signal includes:

subsequent to collecting the image data sent by the display signal unit, sending, by the image collector, the image data to the signal processor;

optimizing and adjusting, by the signal processor, the received image data to obtain an adjustment result;

sending, by the signal processor, the adjustment result to the signal outputter, processing, by the signal outputter, the adjustment result to obtain a first processing result, and sending, by the signal outputter, the first processing result to the second driver; and subsequent to receiving the first processing result, converting, by the second driver, the first processing result into the control signal, and driving, by the second driver, the non-color liquid crystal display screen to adjust the light transmittance based on the control signal.

Preferably, the step of sending, by the signal processor, the adjustment result to the second driver through the signal outputter includes:

saving, by the signal encoder, image data of a previous frame, optimizing and adjusting, by the signal processor, the image data to obtain the adjustment result, sending, by the signal processor, the adjustment result to the signal outputter, processing, by the signal outputter, the adjustment result to obtain the second processing result, and sending, by the signal outputter, the first processing result to the second driver.

Preferably, the multi-region backlight control system further includes a light sensor, and the main controller further comprises an interface; the light sensor is connected with the interface, and the interface is connected with the signal processor; where the step of subsequent to receiving the image data, converting, by the second driver, the image data into the control signal further includes:

detecting, by the light sensor, change of ambient light around a television to obtain detection data, and sending, by the light sensor, the detection data to the signal processor through the interface;

subsequent to receiving the detection data, dynamically compensating and adjusting, by the signal processor, the adjustment result to obtain a compensation signal;

sending, by the signal processor, the compensation signal to the signal outputter, processing, by the signal outputter, the compensation signal to obtain a second processing result, and sending, by the signal outputter, the second processing result to the second driver; and subsequent to receiving the second processing result, converting, by the second driver, the second processing result into the control signal, and driving, by the second driver, the non-color liquid crystal display screen to adjust the light transmittance based on the control signal.

In addition, in order to achieve the above object, the present application further provides a television, including a memory, a processor, and a multi-region backlight control program stored on the memory and operable on the processor, the multi-region backlight control program, when executed by the processor, implements the steps of any one of the multi-region backlight control method described above.

In addition, in order to achieve the above object, the present application further provides a readable storage medium, a multi-region backlight control program is stored on the readable storage medium, the multi-region backlight control program, when executed by a processor, implements the steps of any one of the multi-region backlight control method described above.

In this application, a non-color liquid crystal display screen is set between a color liquid crystal display screen and a constant backlight source. When receiving an image signal, a main controller processes the image signal to obtain image data and sends the image data to a first driver and a second driver synchronously. The first driver converts the image data into a display signal, and drives the color liquid crystal display screen to output a display image. Meanwhile, the second driver converts the image data into a control signal, and drives the non-color liquid crystal display screen to adjust light transmittance of each pixel of the non-color liquid crystal display screen, and cooperates with the constant backlight source to drive the color liquid crystal display screen to display image. It is realized that in a certain state, the main controller may simultaneously control the rotation angle of the liquid crystal molecules of the color liquid crystal display screen and the non-color liquid crystal display screen, so that lights of different brightness are transmitted through different pixels, thereby achieving the purpose of controlling the brightness and darkness of the multi-region backlight. In this application, the display signal and the control signal are synchronously output to ensure the synchronization of the control of the non-color liquid crystal display screen and the color liquid crystal display screen. At the same time, different regional brightness and darkness in the display signal are output by the main controller to the color liquid crystal display screen to synchronize the control of the switching angle of the liquid crystal molecules in the corresponding region of the non-color liquid crystal display screen to achieve dimming in different regions and improve the display contrast of the screen. The local backlight brightness and darkness is adjusted to improve the dynamic contrast of the display, which greatly reduces light leakage and alleviates the eye fatigue caused by watching the television for a long time. The viewer's eyes gain comfort and the user experience is improved.

The purposes, functional features and advantages of this application will be further described in conjunction with the embodiments and with reference to the drawings.

DETAILED DESCRIPTION OF THE EMBODIMENTS

It should be understood that the specific embodiments described herein are only used to explain the present application, and are not used to limit the present application.

Figure 1:
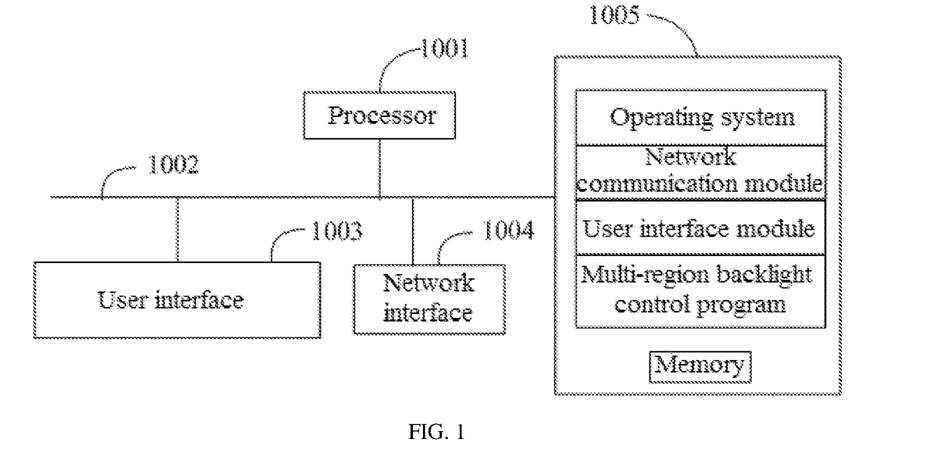
FIG. 1 is a schematic hardware structure diagram of a television according to some embodiments of the present application.

As shown in FIG. 1, FIG. 1 is a schematic hardware structure diagram of a television according to some embodiments of the present application.

As shown in FIG. 1, the television may include: a processor 1001, such as a CPU, a network interface 1004, a user interface 1003, a memory 1005, and a communication bus 1002. The communication bus 1002 is configured to implement connection communication between these components. The user interface 1003 may include a display, an input unit such as a keyboard, and optionally the user interface 1003 may further include a standard wired interface and a wireless interface. The network interface 1004 may optionally include a standard wired interface and a wireless interface (such as a WI-FI interface). The memory 1005 may be a high-speed RAM memory or a stable memory (non-volatile memory), such as a disk memory. The memory 1005 may optionally be a storage device independent of the foregoing processor 1001.

Optionally, the television may further include a camera, an RF (Radio Frequency) circuit, a sensor, an audio circuit, a WiFi module, and so on. Certainly, the television may also be equipped with other sensors such as gyroscopes, barometers, hygrometers, thermometers, and infrared sensors, which will not be repeated here.

Those skilled in the art may understand that the structure of the television shown in FIG. 1 does not constitute a limitation on the television, and more or less components than those illustrated may be included, or certain components may be combined, or different components may be arranged.

As shown in FIG. 1, the memory 1005 as a computer storage medium may include an operating system, a network communication module, a user interface, and a multi-region backlight control program.

In the television shown in FIG. 1, the network interface 1004 is mainly configured to connect to the back-end server and perform data communication with the back-end server; the user interface 1003 is mainly configured to connect to the client (user end) and perform data communication with the client; and the processor 1001 may be configured to call the multi-region backlight control program stored in the memory 1005 and implement the following operations:

in response to receiving an image signal, processing, by a main controller, the image signal to obtain image data, sending, by the main controller, the image data to a first driver and a second driver synchronously, and controlling, by the main controller, a constant backlight source to be turned on;

converting, by the first driver, the received image data into a display signal, and driving, by the first driver, the color liquid crystal display screen to output a display image based on the display signal; and converting, by the second driver, the received image data into a control signal, and driving, by the second driver, the non-color liquid crystal display screen to adjust light transmittance based on the control signal.

Further, the processor 1001 may call the multi-region backlight control program stored in the memory 1005, and further implements the following operations:

in response to receiving the image signal, decoding, by a signal decoder, the image signal to obtain image information;

processing, by a display signal unit, the received image information to obtain the image data;

sending, by the display signal unit, the image data to a signal encoder and the second driver; and encoding, by the signal encoder, the received image data according to an output signal standard to obtain an encoding result, and outputting, by the signal encoder, the encoding result to the first driver.

Further, the processor 1001 may call the multi-region backlight control program stored in the memory 1005, and further implements the following operations:

subsequent to collecting the image data sent by the display signal unit, sending, by the image collector, the image data to the signal processor;

optimizing and adjusting, by the signal processor, the received image data to obtain an adjustment result;

sending, by the signal processor, the adjustment result to a signal outputter, processing, by a signal outputter, the adjustment result to obtain a first processing result, and sending, by the signal outputter, the first processing result to the second driver; and subsequent to receiving the first processing result, converting, by the second driver, the first processing result into the control signal, and driving, by the second driver, the non-color liquid crystal display screen to adjust the light transmittance based on the control signal.

Further, the processor 1001 may call the multi-region backlight control program stored in the memory 1005, and further implements the following operations:

saving, by the signal encoder, image data of a previous frame, optimizing and adjusting, by the signal processor, the image data to obtain the adjustment result, sending, by the signal processor, the adjustment result to the signal outputter, processing, by the signal outputter, the adjustment result to obtain the first processing result, and sending, by the signal outputter, the first processing result to the second driver.

Further, the processor 1001 may call the multi-region backlight control program stored in the memory 1005, and further implements the following operations:

detecting, by the light sensor, change of ambient light around a television to obtain detection data, and sending, by the light sensor, the detection data to the signal processor through the interface;

subsequent to receiving the detection data, dynamically compensating and adjusting, by the signal processor, the adjustment result to obtain a compensation signal;

sending, by the signal processor, the compensation signal to the signal outputter, processing, by the signal outputter, the compensation signal to obtain a second processing result, and sending, by the signal outputter, the second processing result to the second driver; and subsequent to receiving the second processing result, converting, by the second driver, the second processing result into the control signal, and driving, by the second driver, the non-color liquid crystal display screen to adjust the light transmittance based on the control signal.

Figure 2:
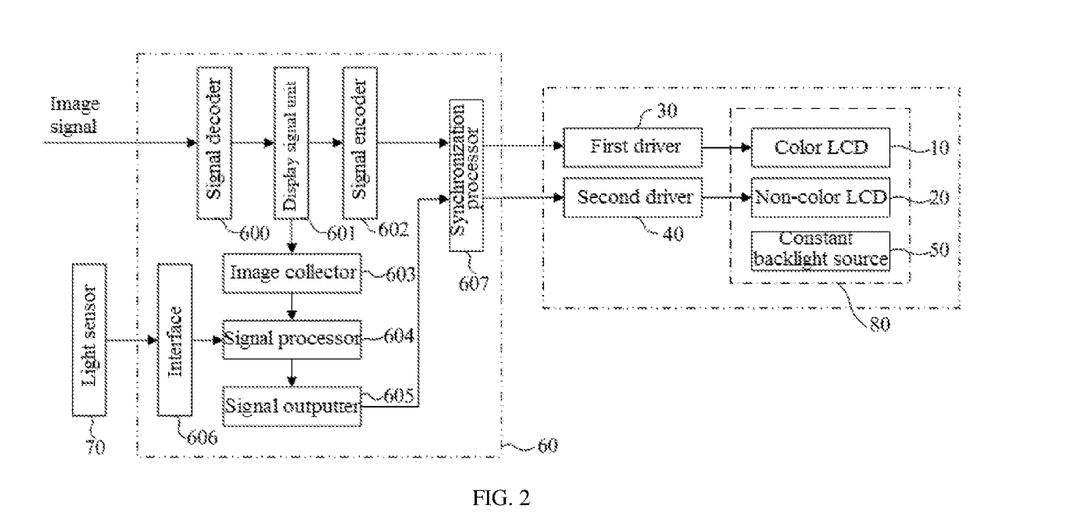
FIG. 2 is a block schematic diagram of a multi-region backlight control system according to some embodiments of this application.
Figure 3:
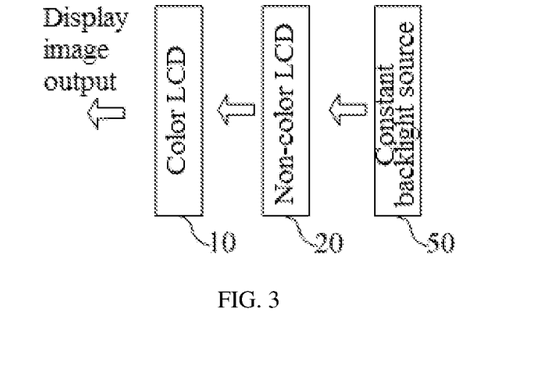
FIG. 3 is a light flow diagram of the multi-region backlight control system according to some embodiments of this application.

Referring to FIGS. 2 to 3, FIG. 2 is a block schematic diagram of a multi-region backlight control system according to some embodiments of this application; and FIG. 3 is a light flow diagram of the multi-region backlight control system according to some embodiments of this application.

In some embodiments, the multi-region backlight control system includes a color liquid crystal display screen 10, a non-color liquid crystal display screen 20, a first driver 30, a second driver 40, a constant backlight source 50, and a main controller 60. The color liquid crystal display screen 10 and the non-color liquid crystal display screen 20 are sequentially fixed on the constant backlight source 50, and the non-color liquid crystal display screen 20 is disposed between the color liquid crystal display screen 10 and the constant backlight source 50. The main controller 60 is respectively connected with the first driver 30, the second driver 40 and the constant backlight source 50, the first driver 30 is electrically connected with the color liquid crystal display screen 10, and the second driver 40 is electrically connected with the non-color liquid crystal display screen 20.

In response to receiving an image signal, the main controller 60 is configured to process the image signal to obtain image data, the main controller 60 is configured to send the image data to the first driver 30 and the second driver 40 synchronously and control the constant backlight source 50 to be turned on. The first driver 30 is configured to convert the received image data into a display signal and drive the color liquid crystal display screen 10 to output a display image based on the display signal. The second driver 40 is configured to convert the received image data into a control signal and drive the non-color liquid crystal display screen 20 to adjust light transmittance of each pixel of the non-color liquid crystal display screen 20 based on the control signal.

The color liquid crystal display screen 10 is a liquid crystal display screen with a color filter, that is, the liquid crystal display screen currently used in liquid crystal display products such as televisions, which may output color images. The non-color liquid crystal display screen 20 is a liquid crystal display without a color filter, which only includes filters, TFTs and liquid crystals, etc. TFT (Thin Film Transistor) may only output black and white images. The constant backlight source 50 may be in the form of a direct array of LED lights, or may be an edge-lit linear arrangement, and may also be other types of backlight sources. This system may be applied to a variety of backlight source solutions. The color liquid crystal display screen 10 is the main display screen and the outermost image display of the entire displayer 80. The non-color liquid crystal display screen 20 is designed between the color liquid crystal display screen 10 and the constant backlight source 50, which is used as the light transmittance controller of the backlight control system and configured to adjust the light transmittance by controlling the rotation angle of the liquid crystal molecules. The main controller 60 outputs the display signal to the color liquid crystal display screen 10 and the control signal to the non-color liquid crystal display screen 20 synchronously, that is, in a certain state, the main controller 60 controls the rotation angles of the liquid crystal molecules of the color liquid crystal display screen 10 and the non-color liquid crystal display screen 20 simultaneously. After the constant backlight source 50 passes through the non-color liquid crystal display screen 20, lights of different brightness are transmitted through different pixels to achieve the purpose of controlling the brightness and darkness of the multi-region backlight.

The main controller 60 may output the display signal and the control signal synchronously, which may be realized by setting a synchronization processor 607 in the main controller. The synchronization processor 607 may be implemented by a clock signal. For example, when the display signal is output and the clock signal is detected to be converted from low to high, the control signal is controlled to be output, so that the synchronous output of the display signal and the control signal is realized. The synchronous output of the display signal and the control signal is realized by the synchronization processor 607, so that the effect of this control mode is more favorable. This application has been proved by experiments that, even if the synchronization processor 607 is not provided, the difference between the output of the display signal and the output of the control signal is only a few milliseconds, and the human eye cannot perceive it when viewing the display image, which does not affect the viewing effect. The main controller 60 outputs the display signal and the control signal synchronously to ensure the synchronization of control of the non-color liquid crystal display screen and the color liquid crystal display screen. Different regional brightness and darkness in the display signal output by the main controller to the color liquid crystal display screen are calculated through a specific algorithm, so as to synchronously control the switching angle of the liquid crystal molecules in the corresponding region of the non-color liquid crystal display screen to achieve dimming in different regions and improve screen contrast.

In this application, a non-color liquid crystal display screen 20 is set between a color liquid crystal display screen 10 and a constant backlight source 50. When receiving an image signal, a main controller 60 processes the image signal to obtain image data and sends the image data to a first driver 30 and a second driver 40 synchronously. The first driver 30 converts the image into a display signal, and drives the color liquid crystal display screen 10 to output a display image. Meanwhile, the second driver 40 converts the image data into a control signal, and drives the non-color liquid crystal display screen 20 to adjust light transmittance of each pixel of the non-color liquid crystal display screen, and cooperates with the constant backlight source 50 to drive the color liquid crystal display screen 10 to display image. It is realized that in a certain state, the main controller 60 may simultaneously control the rotation angle of the liquid crystal molecules of the color liquid crystal display screen 10 and the non-color liquid crystal display screen 20, so that lights of different brightness are transmitted through different pixels, thereby achieving the purpose of controlling the brightness and darkness of the multi-region backlight. In this application, the display signal and the control signal are synchronously output to ensure the synchronization of the control of the non-color liquid crystal display screen 20 and the color liquid crystal display screen 10. At the same time, different regional brightness and darkness in the display signal are output by the main controller 60 to the color liquid crystal display screen to synchronize the control of the switching angle of the liquid crystal molecules in the corresponding region of the non-color liquid crystal display screen 20 to achieve dimming in different regions and improve the display contrast of the screen. The local backlight brightness and darkness is adjusted to improve the dynamic contrast of the display, which greatly reduces light leakage and alleviates the eye fatigue caused by watching the television for a long time. The viewer's eyes gain comfort and the user experience is improved.

Preferably, the main controller 60 includes a signal decoder 600, a display signal unit 601, a signal encoder 602, an image collector 603, a signal processor 604 and a signal outputter 605. The signal decoder 600, the display signal unit 601, the signal encoder 602 and the first driver 30 are connected in sequence. The display signal unit 601, the image collector 603, the signal processor 604, the signal outputter 605 and the second driver 40 are connected in sequence.

The signal decoder 600 decodes the input image signal, and then the decoded signal is encoded according to the output signal standard through the display signal unit 601 and the signal encoder 602 to output, so as to obtain image data signal and clock signal such as VBO (V-By-One), LVDS to drive the color liquid crystal display screen 10 for display. The image signal collector collects the decoded display signal and adjusts and optimizes the display signal through software algorithms in signal processing to achieve the intended purpose. The adjusted and optimized signal, that is, the adjustment result, is encoded by the signal outputter 605 and output to the second driver 40, thus the purpose of controlling the non-color liquid crystal display screen 20 is achieved. The signal processor 604 may use the image data collected in the previous frame for statistics and processing to obtain the corresponding adjustment result, and then re-encode and output the adjustment result through the signal outputter 605. A new image signal obtained by the second driver 40 is applied in the image display of the next frame, so that the dynamic control of the backlight in different pixel regions of the non-color liquid crystal display screen 20 is realized.

Preferably, the multi-region backlight control system further includes a light sensor 70, where the main controller further includes an interface 606. The light sensor 70 is connected with the interface 606, and the interface 606 is connected with the signal processor 604. The light sensor 70 is configured to detect change of ambient light around a television to obtain detection data, and the light sensor 70 is configured to send the detection data to the signal processor 604 through the interface 606. The signal processor 604 is configured to process the detection data after receiving the detection data.

Figure 8:
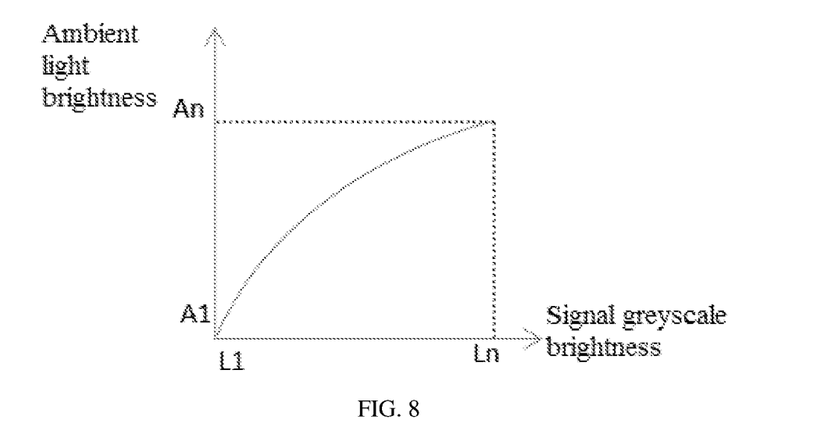
FIG. 8 is a diagram of gray-scale brightness changes of the multi-region backlight control method according to some embodiments of this application.

As shown in FIG. 8, the light sensor 70 detects changes in ambient light around the television and transmits the detection data to the main controller 60 in real time. The main controller 60 converts the collected image signals to perform dynamic compensation adjustment according to the changes in ambient light to enhance or reduce the light transmittance of the backlight in the non-color liquid crystal display screen 20, so as to achieve the enhancement or reduction of the grayscale value displayed by the non-color liquid crystal display screen 20, thereby achieving the purpose of overall enhancement and reduction of the backlight. For example, when the ambient light is different, the detected data is A1 to An, where the ambient light corresponding to An is the brightest and the ambient light corresponding to A1 is the darkest. The software uses the formula $L=aA^2+bA+C$ and the algorithm to set the brightness value of the output signal corresponding to A1 as L1 and set the brightness value of the output signal corresponding to An as Ln, where L1 to Ln correspond to gray-scale brightness change curve of the output signal. This curve may be used to calculate the brightness value L through software algorithm and certain formula and set different modes according to the different scenes of the screen, so as to achieve the purpose of using non-color liquid crystal glass to control the light transmittance to strengthen and reduce the backlight.

Figure 4:
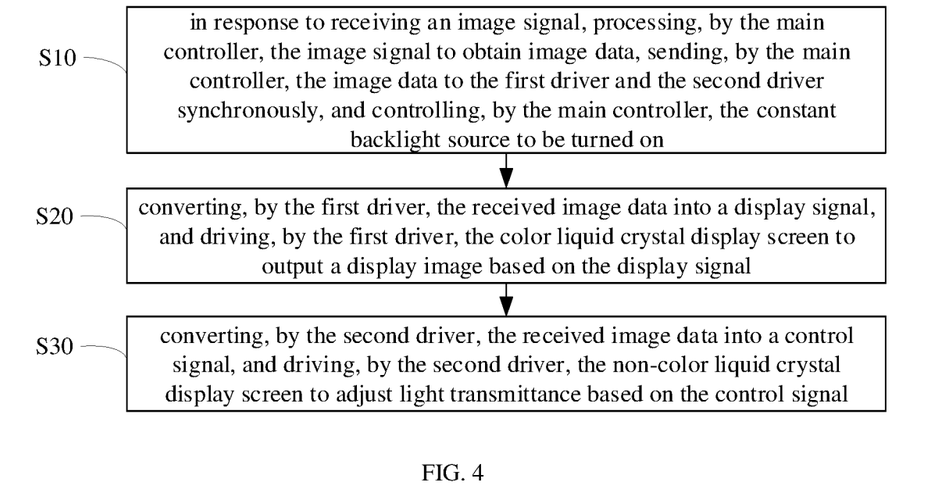
FIG. 4 is a schematic flowchart of a multi-region backlight control method according to some embodiments of this application.

Referring to FIG. 4, FIG. 4 is a schematic flowchart of a multi-region backlight control method according to some embodiments of this application.

In some embodiments, the multi-region backlight control method includes:

Step S10: in response to receiving an image signal, processing, by the main controller, the image signal to obtain image data, sending, by the main controller, the image data to the first driver and the second driver synchronously, and controlling, by the main controller, the constant backlight source to be turned on.

In some embodiments, the first driver and the second driver may convert the image data signals and clock signals such as VBO, LVDS, etc. output by the main controller into line field control signals that can be recognized by the liquid crystal display screen. The distortion degree of liquid crystal molecules is changed by TFT operation in the control panel of the line field control signal, thereby changing the light transmittance of each pixel, and driving the liquid crystal display screen to display images in cooperation with the backlight.

Step S20: converting, by the first driver, the received image data into a display signal, and driving, by the first driver, the color liquid crystal display screen to output a display image based on the display signal.

In some embodiments, the first driver converts the received image data into the display signal, and drives the color liquid crystal display screen to output the display image based on the display signal. When the image signal is received, the signal decoder decodes the image signal to obtain image information. The signal decoder sends the image information to the display signal unit, and the display signal unit processes the image information to obtain image data. The display signal unit sends the image data to the signal encoder, and the encoder encodes according to the output signal standard, and outputs the encoding result to the first driver, so as to convert the encoding result into a display signal, and the first driver drives the color liquid crystal display screen to output the display image based on the display signal.

Step S30: converting, by the second driver, the received image data into a control signal, and driving, by the second driver, the non-color liquid crystal display screen to adjust light transmittance based on the control signal.

In some embodiments, the second driver converts the received image data into the control signal, and drives the non-color liquid crystal display screen to adjust the light transmittance based on the control signal. The main controller may output the display signal and the control signal synchronously, which may be realized by setting a synchronization processor in the main controller. The synchronization processor may be implemented by a clock signal. For example, when the display signal is output and the clock signal is detected to be converted from low to high, the control signal is controlled to be output, so that the synchronous output of the display signal and the control signal is realized. The synchronous output of the display signal and the control signal is realized by the synchronization processor, so that the effect of this control mode is more favorable. This application has been proved by experiments that, even if the synchronization processor is not provided, the difference between the output of the display signal and the output of the control signal is only a few milliseconds, and the human eye cannot perceive it when viewing the display image, which does not affect the viewing effect. The main controller outputs the display signal and the control signal synchronously to ensure the synchronization of control of the non-color liquid crystal display screen and the color liquid crystal display screen. Different regional brightness and darkness in the display signal output by the main controller to the color liquid crystal display screen are calculated through a specific algorithm, so as to synchronously control the switching angle of the liquid crystal molecules in the corresponding region of the non-color liquid crystal display screen to achieve dimming in different regions and improve screen contrast. The first driver drives the color liquid crystal display screen to output the display image according to the display signal. At the same time, the second driver drives the non-color liquid crystal display screen to adjust its light transmittance according to the control signal, and the main controller controls the constant backlight source to be turned on. In order to output the display signal and the control signal synchronously, the signal processor in the main controller may use the image data collected in the previous frame for statistics and processing to obtain the corresponding adjusted image signal, and then re-encode and output the image signal through the signal outputter. The new image signal obtained by the second driver is applied to the image display of the next frame to realize the dynamic control of the backlight in different pixel regions of the non-color liquid crystal display screen. In addition, the signal encoder in the main controller may also store the image data of the last frame, and wait for the image collector, the signal processor and signal outputter to process, encode and output the collected signal, and then output at the same time, so that the first driver and the second driver may simultaneously acquire one frame of signal display data. thereby eliminating the display image distortion caused by scene switching.

In this application, a non-color liquid crystal display screen is set between a color liquid crystal display screen and a constant backlight source. When receiving an image signal, a main controller processes the image signal to obtain image data and sends the image data to a first driver and a second driver synchronously. The first driver converts the image data into a display signal, and drives the color liquid crystal display screen to output a display image. Meanwhile, the second driver converts the image data into a control signal, and drives the non-color liquid crystal display screen to adjust light transmittance of each pixel of the non-color liquid crystal display screen, and cooperate with the constant backlight source to drive the color liquid crystal display screen to display image. It is realized that in a certain state, the main controller may simultaneously control the rotation angle of the liquid crystal molecules of the color liquid crystal display screen and the non-color liquid crystal display screen, so that lights of different brightness are transmitted through different pixels, thereby achieving the purpose of controlling the brightness and darkness of the multi-region backlight. In this application, the display signal and the control signal are output synchronously to ensure the synchronization of control of the non-color liquid crystal display screen and the color liquid crystal display screen. At the same time, different regional brightness and darkness in the display signal are output by the main controller to the color liquid crystal display screen, so as to synchronously control the switching angle of the liquid crystal molecules in the corresponding region of the non-color liquid crystal display screen to achieve dimming in different regions and improve screen contrast.

Figure 5:
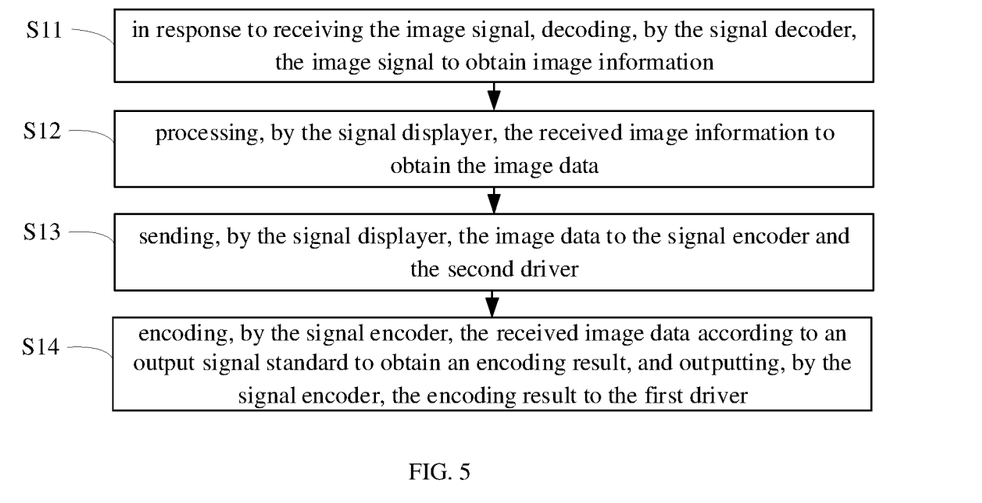
FIG. 5 is a schematic flowchart of the multi-region backlight control method according to some embodiments of this application.

In some embodiments, the main controller includes a signal decoder, a display signal unit, and a signal encoder. The signal decoder, the display signal unit, the signal encoder, and the first driver are connected in sequence. Referring to FIG. 5, step S10 includes:

S11: in response to receiving the image signal, decoding, by the signal decoder, the image signal to obtain image information;

S12: processing, by the display signal unit, the received image information to obtain the image data;

S13: sending, by the display signal unit, the image data to the signal encoder and the second driver; and S14: encoding, by the signal encoder, the received image data according to an output signal standard to obtain an encoding result, and outputting, by the signal encoder, the encoding result to the first driver.

In some embodiments, the first driver and the second driver may convert the image data signals and clock signals such as VBO (V-By-One) (digital interface standard), LVDS (Low Voltage Differential Signal), etc. output by the main controller into line field control signals that can be recognized by the liquid crystal display screen. The distortion degree of liquid crystal molecules is changed by TFT operation in the control panel of the line field control signal, thereby changing the light transmittance of each pixel, and driving the liquid crystal display screen to display images in cooperation with the backlight. The signal decoder decodes the input image signal, and then the decoded signal is encoded according to the output signal standard through the display signal unit and the signal encoder to output, so as to obtain image data signal and clock signal such as VBO (V-By-One), LVDS to drive the color liquid crystal display screen 10 for display.

Figure 6:
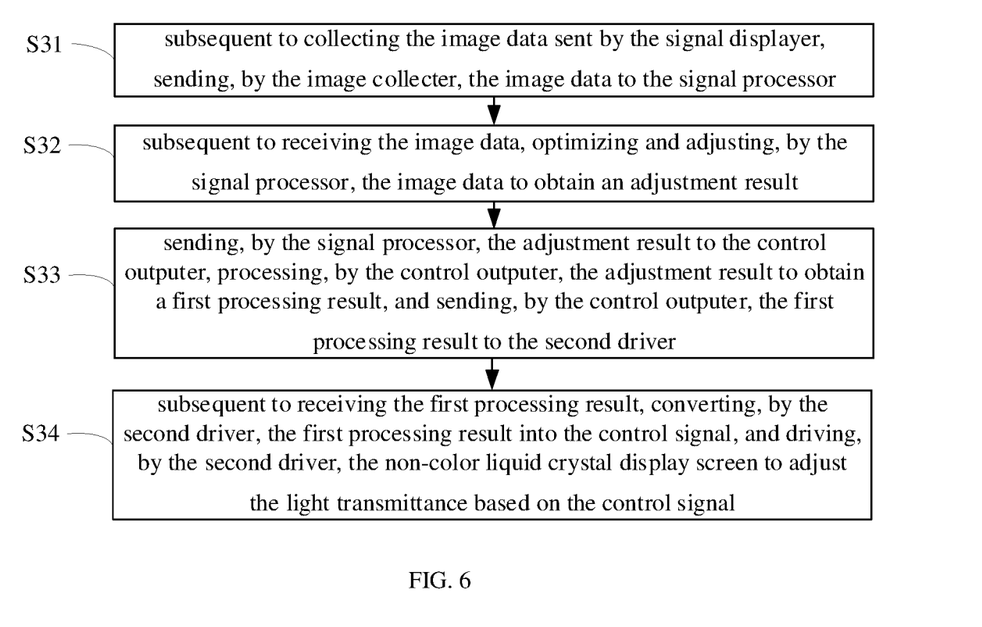
FIG. 6 is a schematic flowchart of the multi-region backlight control method according to some embodiments of this application.
Figure 7:
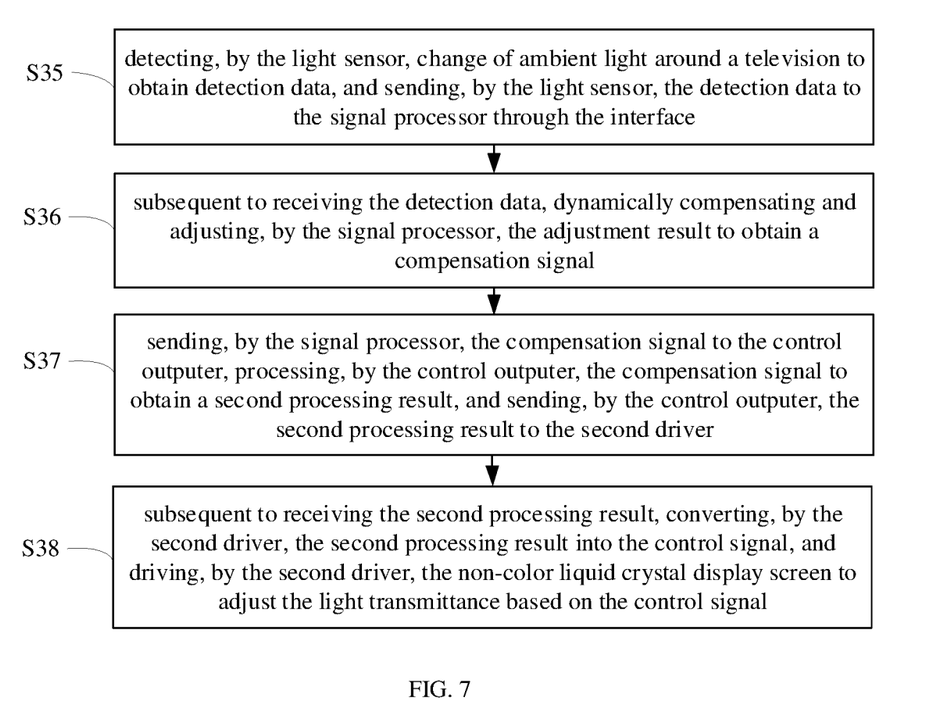
FIG. 7 is a schematic flowchart of the multi-region backlight control method according to some embodiments of this application.

In some embodiments, the main controller further includes an image collector, a signal processor and a signal outputter. The display signal unit, the image collector, the signal processor, the signal outputter and the second driver are connected in sequence. Please refer to FIG. 6, step S30 includes:

S31: subsequent to collecting the image data sent by the display signal unit, sending, by the image collector, the image data to the signal processor;

S32: subsequent to receiving the image data, optimizing and adjusting, by the signal processor, the image data to obtain an adjustment result;

S33: sending, by the signal processor, the adjustment result to the signal outputter, processing, by the signal outputter, the adjustment result to obtain a first processing result, and sending, by the signal outputter, the first processing result to the second driver; and S34: subsequent to receiving the first processing result, converting, by the second driver, the first processing result into the control signal, and driving, by the second driver, the non-color liquid crystal display screen to adjust the light transmittance based on the control signal.

In some embodiments, the control signal is controlled by the image collector, the signal processor and the signal outputter. The signal outputter may encode the adjustment result to obtain image data signal and clock signal such as VBO (V-By-One) and LVDS, and the image data signal and the clock signal are output to the second driver to realize the synchronous output of the control signal and the display signal. The signal processor may use the image data collected in the previous frame for statistics and processing to obtain the corresponding adjustment result, and then re-encode and output the adjustment result through the signal outputter. A new image signal obtained by the second driver is applied in the image display of the next frame, so that the dynamic control of the backlight in different pixel regions of the non-color liquid crystal display screen is realized.

Further, step S33 includes:

saving, by the signal encoder, image data of a previous frame, optimizing and adjusting, by the signal processor, the image data to obtain the adjustment result, sending, by the signal processor, the adjustment result to the second driver through the signal outputter.

In some embodiments, the signal encoder may store the image data of the last frame, and wait for the image collector, the signal processor and signal outputter to process, encode and output the collected signal, and then output at the same time, so that the first driver and the second driver may simultaneously acquire one frame of signal display data to eliminate the display image distortion caused by scene switching.

In some embodiments, the multi-region backlight control system further includes a light sensor, the light sensor is connected with an interface, and the interface is connected with the signal processor. Please refer to FIG. 6, step S30 further includes:

S35: detecting, by the light sensor, change of ambient light around a television to obtain detection data, and sending, by the light sensor, the detection data to the signal processor through the interface;

S36: subsequent to receiving the detection data, dynamically compensating and adjusting, by the signal processor, the adjustment result to obtain a compensation signal;

S37: sending, by the signal processor, the compensation signal to the signal outputter, processing, by the signal outputter, the compensation signal to obtain a second processing result, and sending, by the signal outputter, the second processing result to the second driver; and S38: subsequent to receiving the second processing result, converting, by the second driver, the second processing result into the control signal, and driving, by the second driver, the non-color liquid crystal display screen to adjust the light transmittance based on the control signal.

In some embodiments, the light sensor obtains detection data after detecting changes in ambient light around the television, and the light sensor sends the detection data to the signal processor through the interface. After receiving the detection data, the signal processor performs dynamic compensation adjustment on the adjustment result to obtain a compensation signal. The signal processor sends the compensation signal to the signal outputter, and the signal outputter processes the compensation signal to obtain a second processing result and send the second processing result to the second driver. After receiving the second processing result, the second driver converts the second processing result into a control signal and drives the non-color liquid crystal display screen to adjust the light transmittance based on the control signal. As shown in FIG. 8, the light sensor 70 detects changes in ambient light around the television and transmits the detection data to the main controller 60 in real time. The main controller 60 converts the collected image signals to perform dynamic compensation adjustment according to the changes in ambient light to enhance or reduce the light transmittance of the backlight in the non-color liquid crystal display screen 20, so as to achieve the enhancement or reduction of the grayscale value displayed by the non-color liquid crystal display screen 20, thereby achieving the purpose of overall enhancement and reduction of the backlight. For example, when the ambient light is different, the detected data is A1 to An, where the ambient light corresponding to An is the brightest and the ambient light corresponding to A1 is the darkest. The software uses the formula $L=aA^2+bA+C$ and the algorithm to set the brightness value of the output signal corresponding to A1 as L1 and set the brightness value of the output signal corresponding to An as Ln, where L1 to Ln correspond to gray-scale brightness change curve of the output signal. This curve may be used to calculate the brightness value L through software algorithm and certain formula and set different modes according to the different scenes of the screen, so as to achieve the purpose of using non-color liquid crystal glass to control the light transmittance to strengthen and reduce the backlight.

In addition, some embodiments of the present application further provide a readable storage medium on which a multi-region backlight control program is stored, and when the multi-region backlight control program is executed by a processor, the steps of the multi-region backlight control method described above are implemented.

The specific embodiments of the readable storage medium of the present application are basically the same as the various embodiments of the multi-region backlight control system described above, and are not repeated here.

It should be noted that in this article, the terms "comprise", "include" or any other variant thereof are intended to cover non-exclusive inclusion, so that a process, method, article or device that includes a series of elements includes not only those elements, but also other elements that are not explicitly listed, or include elements inherent to such processes, methods, objects, or devices. Without more restrictions, the element defined by the sentence "comprise a . . . " does not exclude that there are other identical elements in the process, method, article or device that includes the element.

The sequence numbers of the above embodiments of the present application are for description only, and do not represent the advantages and disadvantages of the embodiments.

Through the description of the above embodiments, those skilled in the art can clearly understand that the methods in the above embodiments can be implemented by means of software plus a necessary general hardware platform, and of course, can also be implemented by hardware, but in many cases the former is the better. Based on this understanding, the technical solution of the present application can be embodied in the form of a software product in essence or part that contributes to the existing technology, and the computer software product is stored in a storage medium as described above (such as a ROM/RAM, a magnetic disk, an optical disk), including several instructions to enable a device (which may be a mobile phone, computer, server, air conditioner, or network equipment, etc.) to perform the method described in each embodiment of the present application.

The above are only preferred embodiments of the present application and do not limit the patent scope of the present application. Any equivalent structure or equivalent process transformation made by the description and drawings of the present application, or directly or indirectly used in other related technical fields are similarly included in the patent protection scope of the present application.

What is claimed is:

1. A multi-region backlight control system, comprising a color liquid crystal display screen, a non-color liquid crystal display screen, a first driver, a second driver, a constant backlight source, and a main controller;

wherein the color liquid crystal display screen and the non-color liquid crystal display screen are sequentially fixed on the constant backlight source, and the non-color liquid crystal display screen is disposed between the color liquid crystal display screen and the constant backlight source;

the main controller is respectively connected with the first driver, the second driver and the constant backlight source, the first driver is electrically connected with the color liquid crystal display screen, and the second driver is electrically connected with the non-color liquid crystal display screen;

in response to receiving an image signal, the main controller is configured to process the image signal to obtain image data, the main controller is configured to send the image data to the first driver and the second driver synchronously and control the constant backlight source to be turned on; the first driver is configured to convert the received image data into a display signal and drive the color liquid crystal display screen to output a display image based on the display signal; the second driver is configured to convert the received image data into a control signal and drive the non-color liquid crystal display screen to adjust light transmittance of each pixel of the non-color liquid crystal display screen based on the control signal;

the main controller is configured to output different regional brightness and darkness in the display signal to the color liquid crystal display screen to synchronously control a switching angle of liquid crystal molecules in a corresponding region of the non-color liquid crystal display screen; and the main controller is configured to perform dynamic compensation adjustment on collected image signals according to the changes in the ambient light, to enhance or reduce a light transmittance of a backlight in the non-color liquid crystal display screen, to enhance or reduce a brightness value displayed by the non-color liquid crystal display screen; wherein when the ambient light is different, the detected data is A1 to An, where the ambient light corresponding to An is the brightest and the ambient light corresponding to A1 is the darkest, the formula $L=aA^2+bA+C$ and the algorithm are used to set a brightness value of an output signal corresponding to A1 as L1 and set a brightness value of an output signal corresponding to An as Ln, where L1 to Ln correspond to gray-scale brightness change curve of the output signal.

2. The multi-region backlight control system according to claim 1, wherein the main controller comprises a signal decoder, a display signal unit, a signal encoder, an image collector, a signal processor and a signal outputter; the signal decoder, the display signal unit, the signal encoder and the first driver are connected in sequence; the display signal unit, the image collector, the signal processor, the signal outputter and the second driver are connected in sequence.

3. The multi-region backlight control system according to claim 2, further comprising a light sensor, wherein the main controller further comprises an interface; the light sensor is connected with the interface, and the interface is connected with the signal processor; the light sensor is configured to detect change of ambient light around a television to obtain detection data, and the light sensor is configured to send the detection data to the signal processor through the interface; the signal processor is configured to process the detection data after receiving the detection data.

4. A multi-region backlight control method, applied to a television comprising a multi-region backlight control system, wherein the multi-region backlight control system comprises a color liquid crystal display screen, a non-color liquid crystal display screen, a first driver, a second driver, a constant backlight source, and a main controller; the color liquid crystal display screen and the non-color liquid crystal display screen are sequentially fixed on the constant backlight source, and the non-color liquid crystal display screen is disposed between the color liquid crystal display screen and the constant backlight source; the main controller is respectively connected with the first driver, the second driver and the constant backlight source, the first driver is electrically connected with the color liquid crystal display screen, and the second driver is electrically connected with the non-color liquid crystal display screen; wherein the multi-region backlight control method comprises the following steps:

in response to receiving an image signal, processing, by the main controller, the image signal to obtain image data, sending, by the main controller, the image data to the first driver and the second driver synchronously, and controlling, by the main controller, the constant backlight source to be turned on;

converting, by the first driver, the received image data into a display signal, and driving, by the first driver, the color liquid crystal display screen to output a display image based on the display signal;

converting, by the second driver, the received image data into a control signal, and driving, by the second driver, the non-color liquid crystal display screen to adjust light transmittance based on the control signal;

outputting, by the main controller, different regional brightness and darkness in the display signal to the color liquid crystal display screen to synchronously control a switching angle of liquid crystal molecules in a corresponding region of the non-color liquid crystal display screen; and performing, by the main controller, dynamic compensation adjustment on collected image signals according to the changes in the ambient light, to enhance or reduce the light transmittance of a backlight in the non-color liquid crystal display screen, to enhance or reduce a brightness value displayed by the non-color liquid crystal display screen;

wherein when the ambient light is different, the detected data is A1 to An, where the ambient light corresponding to An is the brightest and the ambient light corresponding to A1 is the darkest, the formula $L=aA^2+bA+C$ and the algorithm are used to set a brightness value of an output signal corresponding to A1 as L1 and set a brightness value of an output signal corresponding to An as Ln, where L1 to Ln correspond to gray-scale brightness change curve of the output signal.

5. The multi-region backlight control method according to claim 4, wherein the main controller comprises a signal decoder, a display signal unit and a signal encoder; the signal decoder, the display signal unit, the signal encoder and the first driver are connected in sequence; wherein the step of in response to receiving an image signal, processing, by the main controller, the image signal to obtain image data, sending, by the main controller, the image data to the first driver and the second driver synchronously comprises:

in response to receiving the image signal, decoding, by the signal decoder, the image signal to obtain image information;

processing, by the display signal unit, the received image information to obtain the image data;

sending, by the display signal unit, the image data to the signal encoder and the second driver; and encoding, by the signal encoder, the received image data according to an output signal standard to obtain an encoding result, and outputting, by the signal encoder, the encoding result to the first driver.

6. The multi-region backlight control method according to claim 4, wherein the main controller further comprises an image collector, a signal processor and a signal outputter; the display signal unit, the image collector, the signal processor, the signal outputter and the second driver are connected in sequence; wherein the step of converting, by the second driver, the received image data into a control signal, and driving, by the second driver, the non-color liquid crystal display screen to adjust light transmittance based on the control signal comprises:

subsequent to collecting the image data sent by the display signal unit, sending, by the image collector, the image data to the signal processor;

optimizing and adjusting, by the signal processor, the received image data to obtain an adjustment result;

sending, by the signal processor, the adjustment result to the signal outputter, processing, by the signal outputter, the adjustment result to obtain a first processing result, and sending, by the signal outputter, the first processing result to the second driver; and subsequent to receiving the first processing result, converting, by the second driver, the first processing result into the control signal, and driving, by the second driver, the non-color liquid crystal display screen to adjust the light transmittance based on the control signal.

7. The multi-region backlight control method according to claim 5, wherein the main controller further comprises an image collector, a signal processor and a signal outputter; the display signal unit, the image collector, the signal processor, the signal outputter and the second driver are connected in sequence; wherein the step of converting, by the second driver, the received image data into a control signal, and driving, by the second driver, the non-color liquid crystal display screen to adjust light transmittance based on the control signal comprises:

subsequent to collecting the image data sent by the display signal unit, sending, by the image collector, the image data to the signal processor; optimizing and adjusting, by the signal processor, the received image data to obtain an adjustment result;

sending, by the signal processor, the adjustment result to the signal outputter, processing, by the signal outputter, the adjustment result to obtain a first processing result, and sending, by the signal outputter, the first processing result to the second driver; and subsequent to receiving the first processing result, converting, by the second driver, the first processing result into the control signal, and driving, by the second driver, the non-color liquid crystal display screen to adjust the light transmittance based on the control signal.

8. The multi-region backlight control method according to claim 7, wherein the step of sending, by the signal processor, the adjustment result to the signal outputter, processing, by the signal outputter, the adjustment result to obtain a first processing result, and sending, by the signal outputter, the first processing result to the second driver comprises:

saving, by the signal encoder, image data of a previous frame, optimizing and adjusting, by the signal processor, the image data to obtain the adjustment result, sending, by the signal processor, the adjustment result to the signal outputter, processing, by the signal outputter, the adjustment result to obtain the first processing result, and sending, by the signal outputter, the first processing result to the second driver.

9. The multi-region backlight control method according to claim 5, wherein the multi-region backlight control system further comprises a light sensor, and the main controller further comprises an interface; the light sensor is connected with the interface, and the interface is connected with the signal processor; wherein the step of converting, by the second driver, the received image data into a control signal, and driving, by the second driver, the non-color liquid crystal display screen to adjust light transmittance based on the control signal comprises:

detecting, by the light sensor, change of ambient light around a television to obtain detection data, and sending, by the light sensor, the detection data to the signal processor through the interface;

subsequent to receiving the detection data, dynamically compensating and adjusting, by the signal processor, the adjustment result to obtain a compensation signal;

sending, by the signal processor, the compensation signal to the signal outputter, processing, by the signal outputter, the compensation signal to obtain a second processing result, and sending, by the signal outputter, the second processing result to the second driver; and subsequent to receiving the second processing result, converting, by the second driver, the second processing result into the control signal, and driving, by the second driver, the non-color liquid crystal display screen to adjust the light transmittance based on the control signal.

10. The multi-region backlight control method according to claim 7, wherein the multi-region backlight control system further comprises a light sensor, and the main controller further comprises an interface; the light sensor is connected with the interface, and the interface is connected with the signal processor; wherein the step of converting, by the second driver, the received image data into a control signal, and driving, by the second driver, the non-color liquid crystal display screen to adjust light transmittance based on the control signal comprises:

detecting, by the light sensor, change of ambient light around a television to obtain detection data, and sending, by the light sensor, the detection data to the signal processor through the interface; subsequent to receiving the detection data, dynamically compensating and adjusting, by the signal processor, the adjustment result to obtain a compensation signal;

sending, by the signal processor, the compensation signal to the signal outputter, processing, by the signal outputter, the compensation signal to obtain a second processing result, and sending, by the signal outputter, the second processing result to the second driver; and subsequent to receiving the second processing result, converting, by the second driver, the second processing result into the control signal, and driving, by the second driver, the non-color liquid crystal display screen to adjust the light transmittance based on the control signal.

11. The multi-region backlight control method according to claim 8, wherein the multi-region backlight control system further comprises a light sensor, and the main controller further comprises an interface; the light sensor is connected with the interface, and the interface is connected with the signal processor;
wherein the step of converting, by the second driver, the received image data into a control signal, and driving, by the second driver, the non-color liquid crystal display screen to adjust light transmittance based on the control signal comprises: detecting, by the light sensor, change of ambient light around a television to obtain detection data, and
sending, by the light sensor, the detection data to the signal processor through the interface; subsequent to receiving the detection data, dynamically compensating and adjusting, by the signal processor, the adjustment result to obtain a compensation signal;
sending, by the signal processor, the compensation signal to the signal outputter, processing, by the signal outputter, the compensation signal to obtain a second processing result, and sending, by the signal outputter, the second processing result to the second driver; and subsequent to receiving the second processing result, converting, by the second driver, the second processing result into the control signal, and
driving, by the second driver, the non-color liquid crystal display screen to adjust the light transmittance based on the control signal.

12. A television, comprising: a memory, a processor, and a multi- region backlight control program stored on the memory and operable on the processor, the multi- region backlight control program, when executed by the processor, implements the following steps:
in response to receiving an image signal, processing, by a main controller, the image signal to obtain image data, sending, by the main controller, the image data to a first driver and a second driver synchronously, and controlling, by the main controller, a constant backlight source to be turned on;
converting, by the first driver, the received image data into a display signal, and driving, by the first driver, a color liquid crystal display screen to output a display image based on the display signal;
converting, by the second driver, the received image data into a control signal, and driving, by the second driver, a non-color liquid crystal display screen to adjust light transmittance based on the control signal; and outputting, by the main controller, different regional brightness and darkness in the display signal to the color liquid crystal display screen to synchronously control a switching angle of liquid crystal molecules in a corresponding region of the non-color liquid crystal display screen; and
performing, by the main controller, dynamic compensation adjustment on collected image signals according to the changes in the ambient light, to enhance or reduce the light transmittance of a backlight in the non-color liquid crystal display screen, to enhance or reduce a brightness value displayed by the non-color liquid crystal display screen; wherein when the ambient light is different, the detected data is A1 to An, where the ambient light corresponding to An is the brightest and the ambient light corresponding to A1 is the darkest, the formula $L=aA^2+bA+C$ and the algorithm are used to set a brightness value of an output signal corresponding to A1 as L1 and set a brightness value of an output signal corresponding to An as Ln, where L1 to Ln correspond to gray-scale brightness change curve of the output signal.

13. The television according to claim 12, wherein the multi-region backlight control program, when executed by the processor, further implements the following steps:
in response to receiving the image signal, decoding, by a signal decoder, the image signal to obtain image information;
processing, by a display signal unit, the received image information to obtain the image data;
sending, by the display signal unit, the image data to a signal encoder and the second driver; and
encoding, by the signal encoder, the received image data according to an output signal standard to obtain an encoding result, and outputting, by the signal encoder, the encoding result to the first driver.

14. The television according to claim 12, wherein the multi-region backlight control program, when executed by the processor, further implements the following steps:
subsequent to collecting the image data sent by the display signal unit, sending, by a image collector, the image data to a signal processor;
optimizing and adjusting, by the signal processor, the received image data to obtain an adjustment result;
sending, by the signal processor, the adjustment result to a signal outputter, processing, by the signal outputter, the adjustment result to obtain a first processing result, and sending, by the signal outputter, the first processing result to the second driver; and
subsequent to receiving the first processing result, converting, by the second driver, the first processing result into the control signal, and driving, by the second driver, the non-color liquid crystal display screen to adjust the light transmittance based on the control signal;
performing, by the main controller, dynamic compensation adjustment on collected image signals according to the changes in the ambient light, to enhance or reduce the light transmittance of a backlight in the non-color liquid crystal display screen, to enhance or reduce a brightness value displayed by the non-color liquid crystal display screen;
wherein when the ambient light is different, the detected data is A1 to An, where the ambient light corresponding to An is the brightest and the ambient light corresponding to A1 is the darkest, the formula $L=aA^2+bA+C$ and the algorithm are used to set a brightness value of an output signal corresponding to A1 as L1 and set a brightness value of an output signal corresponding to An as Ln, where L1 to Ln correspond to gray-scale brightness change curve of the output signal.

15. The television according to claim 13, wherein the multi-region backlight control program, when executed by the processor, further implements the following steps:
subsequent to collecting the image data sent by the display signal unit, sending, by a image collector, the image data to a signal processor;
optimizing and adjusting, by the signal processor, the received image data to obtain an adjustment result;
sending, by the signal processor, the adjustment result to a signal outputter, processing, by the signal outputter, the adjustment result to obtain a first processing result, and
sending, by the signal outputter, the first processing result to the second driver;

subsequent to receiving the first processing result, converting, by the second driver, the first processing result into the control signal, and driving, by the second driver, the non-color liquid crystal display screen to adjust the light transmittance based on the control signals.

16. The television according to claim 15, wherein the multi-region backlight control program, when executed by the processor, further implements the following steps:
saving, by the signal encoder, image data of a previous frame, optimizing and adjusting, by the signal processor, the image data to obtain the adjustment result, sending, by the signal processor, the adjustment result to the signal outputter, processing, by the signal outputter, the adjustment result to obtain the first processing result, and sending, by the signal outputter, the first processing result to the second driver.

17. The television according to claim 13, wherein the multi-region backlight control program, when executed by the processor, further implements the following steps:
detecting, by a light sensor, change of ambient light around a television to obtain detection data, and sending, by the light sensor, the detection data to the signal processor through the interface;
subsequent to receiving the detection data, dynamically compensating and adjusting, by the signal processor, the adjustment result to obtain a compensation signal;
sending, by the signal processor, the compensation signal to the signal outputter, processing, by the signal outputter, the compensation signal to obtain a second processing result, and sending, by the signal outputter, the second processing result to the second driver; and
subsequent to receiving the second processing result, converting, by the second driver, the second processing result into the control signal, and driving, by the second driver, the non-color liquid crystal display screen to adjust the light transmittance based on the control signal.

18. The television according to claim 15, wherein the multi-region backlight control program, when executed by the processor, further implements the following steps:
detecting, by a light sensor, change of ambient light around a television to obtain detection data, and sending, by the light sensor, the detection data to the signal processor through the interface;
subsequent to receiving the detection data, dynamically compensating and adjusting, by the signal processor, the adjustment result to obtain a compensation signal;
sending, by the signal processor, the compensation signal to the signal outputter, processing, by the signal outputter, the compensation signal to obtain a second processing result, and
sending, by the signal outputter, the second processing result to the second driver; and subsequent to receiving the second processing result, converting, by the second driver, the second processing result into the control signal, and driving, by the second driver, the non-color liquid crystal display screen to adjust the light transmittance based on the control signal.

19. The television according to claim 16, wherein the multi-region backlight control program, when executed by the processor, further implements the following steps:
detecting, by a light sensor, change of ambient light around a television to obtain detection data, and sending, by the light sensor, the detection data to the signal processor through the interface;
subsequent to receiving the detection data, dynamically compensating and adjusting, by the signal processor, the adjustment result to obtain a compensation signal;
sending, by the signal processor, the compensation signal to the signal outputter, processing, by the signal outputter, the compensation signal to obtain a second processing result, and sending, by the signal outputter, the second processing result to the second driver; and
subsequent to receiving the second processing result, converting, by the second driver, the second processing result into the control signal, and driving, by the second driver, the non-color liquid crystal display screen to adjust the light transmittance based on the control signal.

20. A non-transitory readable storage medium, wherein a multi-region backlight control program is stored on the readable storage medium, the multi-region backlight control program, when executed by a processor, cause the processor to implement the multi-region backlight control method according to claim 4.

* * * * *